Figure 1:
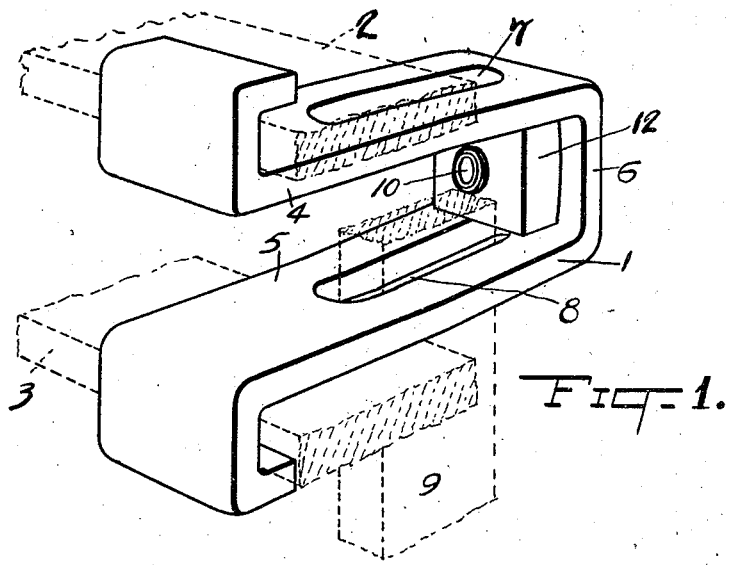

July 31, 1923.

C. H. WHITE

TOOL HOLDER

Filed July 19, 1922

1,463,353

Inventor:
Charles H. White

By W C Jordinston
Attorney

Witness:
E. Wilderson

Patented July 31, 1923.

1,463,353

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

TOOL HOLDER.

Application filed July 19, 1922. Serial No. 576,015.

*To all whom it may concern:*

Be it known that I, CHARLES H. WHITE, a citizen of the United States, residing at Moline, in the county of Rock Island and State of Illinois, have invented certain new and useful Improvements in Tool Holders, of which the following is a specification, reference being had therein to the accompanying drawing.

My invention relates to agricultural implements, such as harrows and cultivators, and more particularly to devices by which ground stirring tools are secured on said implements, and the object of my invention is to provide a tool holder simple in application and economical in construction, readily removable, and adjustable to vary width of cultivation.

Referring to the drawings in which similar numerals indicate identical parts.

Figure 2:
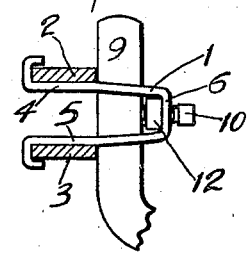
Figure 4:
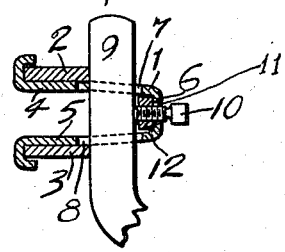
Figure 3:
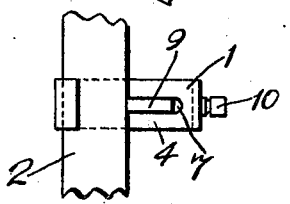

Figure 1 is a perspective view of my invention, illustrating it as applied to the tool carrying bars of a cultivator, shown in dotted lines, and also showing in dotted lines the position of the tool therein. Figure 2 is a reduced detail cross section, in full lines, of Figure 1. Figure 3 is a plan view of Figure 2, and Figure 4 is a longitudinal vertical section of Figure 1.

The holder 1 is particularly adapted to the type of cultivator shown in my pending application Serial No. 447,382, filed February 24, 1921, to which reference is made for a more extended description thereof. The tool carrying bars 2 and 3 are parallel and spaced apart a sufficient distance to permit the insertion therebetween of the tool holder 1. The tool holder 1 is preferably a unitary structure of steel and consists of two arms 4 and 5 which, for the width of the bars 2 and 3, are parallel and then converge slightly to a vertical part 6 integral therewith. The free end of the arm 4 is bent upon itself to clasp a side of the bar 2, and the free end of the arm 5 is similarly formed to clasp a side of the bar 3. A slot 7 in the arm 4 extends centrally thereof from adjacent the part 6 to beyond the adjacent side of the bar 2, and a similar slot 8 is provided in the arm 5 and registers with the slot 7.

In mounting a tool on the bars 2 and 3, the holder is inserted between them until the bent ends of the arms 4 and 5 clasp the bars 2 and 3 respectively, the shank 9 is then inserted through the slots 7 and 8 and contacts with the adjacent sides of the bars 2 and 3. The holder 1 and the tool are held rigidly in position on the bars 2 and 3 by a set screw 10 which passes through a perforation 11 in the vertical part 6 of the holder; a nut 12 is positioned between the shank 9 and the part 6 of the holder and through the nut 12 the set screw 10 passes to contact with the shank 9, and by operation of the set screw the holder 1 is drawn against the bars 2 and 3 and at the same time the shank 9 is forced against the adjacent sides of the bars 2 and 3.

It can be readily understood that by loosening the set screw 10 the holder 1 can be easily moved to any desired position lengthwise of the bars 2 and 3, or all the parts and the tool can be removed.

What I claim is—

1. In a cultivating implement having parallel tool supporting bars, the combination therewith of a tool holder disposed transversely of the bars, means on the holder to clasp one side of said bars, and means to secure a tool in the holder on the opposite side of said bars.

2. In a cultivating implement having parallel tool supporting bars, the combination therewith of a tool holder positioned between said bars and transversely thereof, means on the holder to clasp one side of said bars, and means to secure a tool in the holder on the opposite side of said bars.

3. In a cultivating implement having parallel tool supporting bars, the combination therewith of a tool holder disposed transversely of the bars, means on the holder to clasp one side of said bars, and means to secure a tool in the holder on the opposite side of said bars and in rigid contact therewith.

4. In a cultivating implement having parallel tool supporting bars, the combination therewith of a bi-brachiate tool holder disposed transversely of the bars, the free ends of the arms formed to clasp one side of said bars, and means to secure a tool in the holder on the opposite side of said bars.

5. In a cultivating implement having parallel tool supporting bars, the combination therewith of a bi-brachiate tool holder disposed between the bars and transversely thereof, means on the free ends of the arms to clasp one side of the bars, and means to secure a tool in the holder on the opposite side of said bars.

6. In a cultivating implement having parallel tool supporting bars, the combination therewith of a bi-brachiate tool holder disposed between the bars and transversely thereof, means on the free ends of the arms to clasp one side of the bars, and means to secure a tool in the holder on the opposite side of said bars and in rigid contact therewith.

7. In a cultivating implement having parallel tool supporting bars, the combination therewith of a bi-brachiate tool holder disposed between the bars and transversely thereof, means on the free ends of the arms to clasp one side of the bars, a slot in each arm on the opposite side of said bars registering one with the other and adapted to receive a tool, and means to secure said tool in the slots and in rigid contact with said bars.

CHARLES H. WHITE.